United States Patent
Sgarlata et al.

(10) Patent No.: US 9,162,377 B2
(45) Date of Patent: Oct. 20, 2015

(54) SINK ASSEMBLY

(71) Applicant: Bradley Fixtures Corporation, Menomonee Falls, WI (US)

(72) Inventors: Jonathan Ross Sgarlata, Aurora, MN (US); Robert Michael Piekarski, Germantown, WI (US)

(73) Assignee: Bradley Fixtures Corporation, Menomonee Falls, WI (US)

( * ) Notice: Subject to any disclaimer, the term of this patent is extended or adjusted under 35 U.S.C. 154(b) by 365 days.

(21) Appl. No.: 13/791,604

(22) Filed: Mar. 8, 2013

(65) Prior Publication Data

US 2014/0250589 A1    Sep. 11, 2014

(51) Int. Cl.
*A47K 1/05* (2006.01)
*B29C 39/00* (2006.01)
*E03C 1/33* (2006.01)

(52) U.S. Cl.
CPC . *B29C 39/00* (2013.01); *A47K 1/05* (2013.01); *E03C 1/33* (2013.01); *Y10T 29/4998* (2015.01)

(58) Field of Classification Search
CPC ......................................................... E03C 1/32
USPC ....................................................... 4/619–660
See application file for complete search history.

(56) References Cited

U.S. PATENT DOCUMENTS

| | | | |
|---|---|---|---|
| 2,769,181 A | 11/1956 | Miller | |
| 3,613,128 A | 10/1971 | Moyer | |
| 4,844,944 A | 7/1989 | Graefe et al. | |
| 5,016,297 A | 5/1991 | Sauter et al. | |
| 5,860,172 A | 1/1999 | Pfeiffer | |
| 6,311,345 B1 | 11/2001 | Limbach | |
| 6,530,097 B1 | 3/2003 | Sung | |
| 6,745,416 B2 | 6/2004 | Albarrán | |
| D580,531 S | 11/2008 | Cusimano | |
| D580,532 S | 11/2008 | Cusimano | |
| D625,791 S | 10/2010 | Cusimano | |
| D626,203 S | 10/2010 | Cusimano | |
| 8,245,380 B2 | 8/2012 | Ramamurthy et al. | |
| 2008/0086811 A1 | 4/2008 | Yu | |
| 2009/0144893 A1 | 6/2009 | Cusimano | |
| 2010/0017956 A1 | 1/2010 | Chen | |
| 2011/0300331 A1 | 12/2011 | Drozdowich et al. | |
| 2012/0124737 A1 | 5/2012 | Gibson | |
| 2012/0159703 A1 | 6/2012 | Miller et al. | |
| 2012/0306165 A1 | 12/2012 | Sutter | |

FOREIGN PATENT DOCUMENTS

| | | |
|---|---|---|
| JP | 2002-336146 | 11/2002 |
| JP | 2008-180012 | 8/2008 |
| KR | 200200812 Y1 | 10/2000 |
| KR | 10-2002-0062042 A | 7/2002 |
| KR | 20-0351041 | 5/2004 |
| WO | WO2009/073873 | 6/2009 |

OTHER PUBLICATIONS

International Search Report and Written Opinion for PCT Application No. PCT/US2014/021027, mail date Jun. 11, 2014, 13 pages.

*Primary Examiner* — Lori Baker
(74) *Attorney, Agent, or Firm* — Foley & Lardner LLP

(57) ABSTRACT

A sink assembly includes a basin including one or more sidewalls having interior and exterior surfaces, the one or more sidewalls defining an interior and a top opening; a layer of bonding material provided on the exterior surfaces of the one or more sidewalls and extending about the top opening; and a mounting flange coupled to the layer of bonding material and extending about the top opening of the basin.

22 Claims, 3 Drawing Sheets

SINK ASSEMBLY

BACKGROUND

The present disclosure relates generally to the field of sinks, and more specifically, to sinks intended to be mounted to an underside of a countertop or similar structure and provide a "seamless" appearance for users.

Conventional sinks may be "top-mounted" to countertops (e.g., "drop-in" sinks) by way of a flange that extends over the top surface of the countertop. However, these top-mounted sinks may be visually unappealing, and may contribute to additional cleaning, etc. required around the interface of the flange and the countertop.

Other sink designs may be "under-mounted" to the underside of countertops, for example, by way of an upper portion of a sink basin that has been bent so as to provide a mounting flange for the sink basin. However, such configurations may, like conventional top-mounted designs, be visually unappealing and susceptible to leakage and/or build-up of debris, etc. due to the nature of the joint, or seam, formed between the countertop and the sink basin.

Accordingly, it would be advantageous to provide an under-mount sink assembly with a more visually appealing, "seamless" design.

SUMMARY

One embodiment relates to a sink assembly comprising a basin comprising one or more sidewalls having interior and exterior surfaces and defining an interior and a top opening; a layer of bonding material provided on the exterior surfaces of the one or more sidewalls about the top opening; and a mounting flange coupled to the layer of bonding material and extending about the top opening of the basin.

Another embodiment relates to a method of producing a sink assembly, the method comprising forming a sink basin having a bottom and plurality of sidewalls extending upward from the bottom to a peripheral edge; applying a layer of bonding material to the plurality of sidewalls adjacent the peripheral edge; and casting a mounting flange over the layer of bonding material.

Another embodiment relates to an under-mount sink assembly configured to be mounted to an underside of a countertop, the sink assembly comprising a metal basin, the basin comprising a bottom and a plurality of sidewalls extending upward from the bottom to a top peripheral edge; and a cast polymer mounting flange bonded directly to the basin and having an upper surface configured to be coupled to the underside of a countertop; wherein the mounting flange is retained in position relative to the metal basin entirely by the direct bonding between the basin and the mounting flange.

DETAILED DESCRIPTION OF EXEMPLARY EMBODIMENTS

Figure 1:
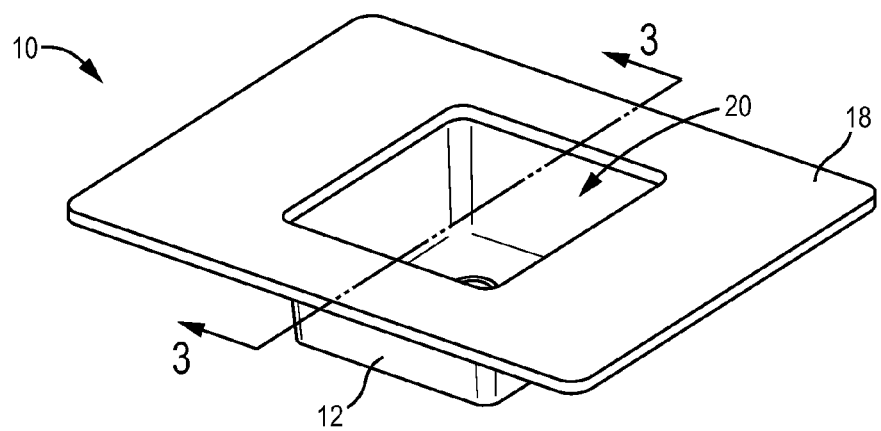
FIG. 1 is a perspective view of a sink assembly under-mounted to a countertop according to an exemplary embodiment.

Referring to FIG. 1, a sink assembly 10 is shown mounted to a countertop 18 according to an exemplary embodiment. As shown in FIG. 1, sink assembly 10 is an "under-mount" sink, such that sink assembly 10 is mounted to an underside (e.g., bottom surface), rather than a top side or surface, of countertop 18. Sink assembly 10 may be used in a wide variety of settings, including public, private, commercial, or other types of establishments utilizing sink assemblies (e.g., as part of a kitchen, etc.).

According to an exemplary embodiment, sink assembly 10 includes a basin 12 (e.g., a metal basin, etc.), a layer of bonding material 14 (e.g., an adhesive or other substrate, layer, etc.), and a mounting flange 16 (e.g., a cast or formed polymer mounting flange, etc.). Sink assembly 10 may further include conventional features such as a basin divider, etc. Countertop 18 includes top and bottom surfaces 24, 26, and an opening 20 defined by a surface 22 that is intended to be aligned with basin 12 of sink assembly 10. Countertop 18 may be made of any of a variety of materials, including stone, engineered stone, laminated materials, metal, etc.

Figure 2:
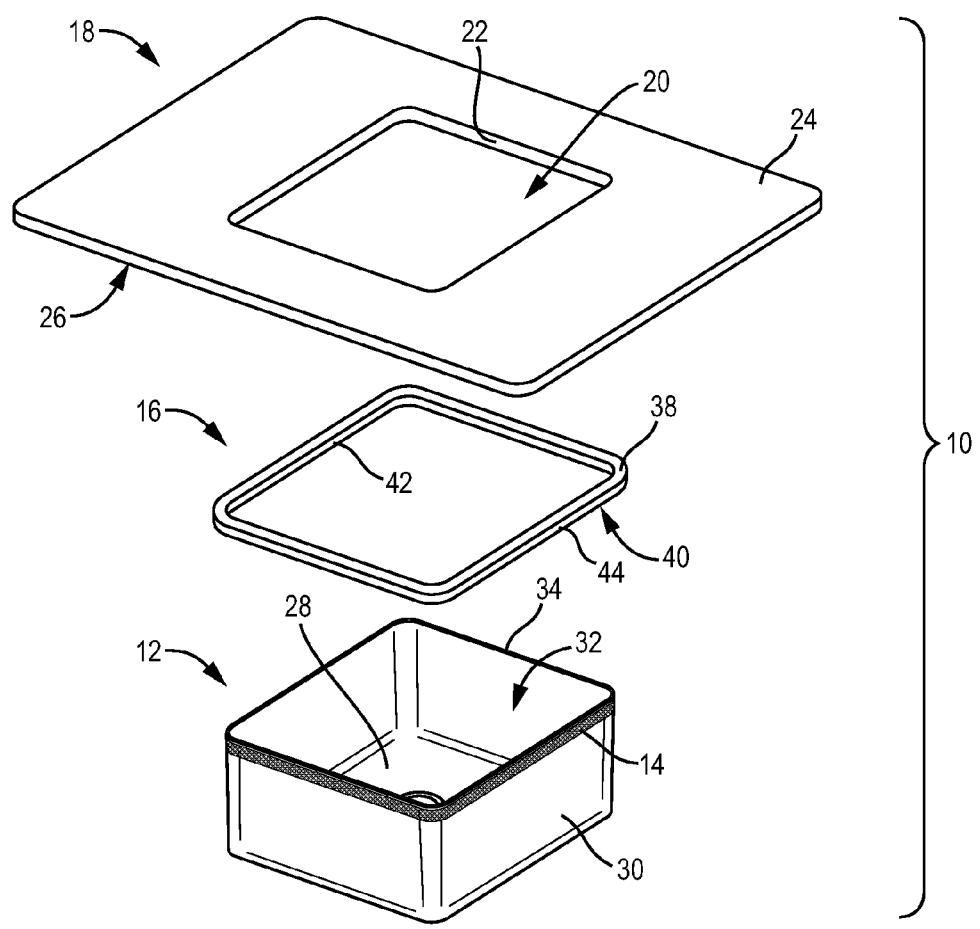
FIG. 2 is an exploded view of the sink assembly and countertop of FIG. 1 according to an exemplary embodiment.
Figure 3:
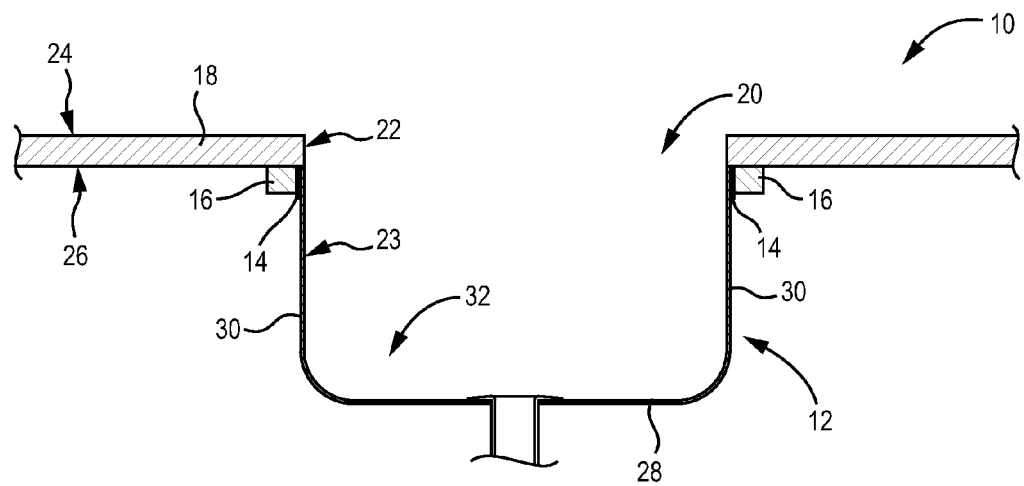
FIG. 3 is a cross-section view of the sink assembly and countertop of FIG. 1 according to an exemplary embodiment.
Figure 4:
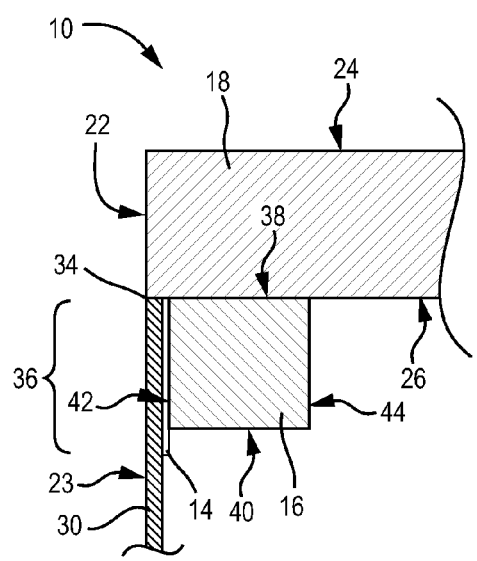
FIG. 4 is a enlarged cross-section view of the sink assembly of FIG. 1 according to an exemplary embodiment.

According to an exemplary embodiment, basin 12 includes a bottom 28 and a number of sidewalls 30 that extend upward from bottom 28 to a top or peripheral edge 34. A drain aperture 31 may be provided in bottom 28 to permit water and other materials to flow into a conventional drain system coupled to sink assembly 10. As shown in FIGS. 2-3, sidewalls 30 extend upward from bottom 28 in a generally "straight" or linear fashion along at least a portion of the height of the sidewalls such that in one embodiment no additional mounting flanges, lips, etc. are formed by sidewalls 30. In one embodiment, basin 12 is a stainless steel basin, and may be formed by any suitable process (e.g., a drawing process in which a sheet of stainless steel material is drawn over a die, a welding process, a combination thereof, etc.). According to other embodiments, basin 12 may be made of other metals (e.g., other alloys, etc.) or other materials and/or be a composite of different materials (e.g., to include additives such as an antimicrobial agent or material, etc.).

Bonding layer 14 is in one embodiment applied to basin 12 such that layer 14 extends about the exterior of basin 12 (e.g., about the exterior surfaces of sidewalls 30) adjacent to peripheral edge 34. For example, layer 14 may extend down from peripheral edge 34 a predetermined distance (e.g., a distance sufficient to accommodate the thickness of mounting flange 16) to define a width 36 and extend about the entire perimeter of basin 12. According to an exemplary embodiment, width 36 of layer 14 is approximately 1.0 inches. According to various alternative embodiments, width 36 of layer 14 may be varied to accommodate differences in sizes of the mounting flange (e.g., such that width 36 is at least as wide as the height or thickness of mounting flange 16). In some embodiments, width 36 may be more or less than the height, or thickness, of mounting flange 16.

Layer 14 is intended to provide a substrate, or base layer, onto which mounting flange 16 may be cast or otherwise formed. In one embodiment, layer 14 is a gel coat (e.g., a vinylester gel coat, etc.) that is applied in liquid form and sets on the exterior surface of basin 12. Layer 14 may be a 100% resin material to provide increased adhesion between layer 14 and both basin 12 and mounting flange 16. In some embodiments, other compositions for layer 14 may be used. According to an exemplary embodiment, layer 14 is applied using a spray process, while in other embodiments, other means may be used to apply layer 14 (e.g., one or more roller applicators, brush applicators, etc.).

Mounting flange 16 is coupled to basin 12 by way of bonding layer 14. According to an exemplary embodiment, mounting flange 16 is a polymer material (e.g., a polymer or plastic material, etc.) that is cast (e.g., poured into a mold, etc.) or otherwise molded (e.g., under pressure) onto bonding layer 14. In one embodiment, mounting flange 16 is configured to provide a solid surface or cast polymer plastic material upon setting, and includes between about 10% and 90% resin (e.g., approximately 33% resin and approximately 67% fillers (including additives, pigments, etc.), more or less than 33% resin, etc.).

A mold having a mold cavity may be provided around the upper portion of basin 12 such that liquid polymer casting material may be poured into the mold cavity to cast mounting flange 16. In one embodiment, mounting flange 16 is cast over bonding layer 14 such that mounting flange 16 extends about the entire perimeter of basin 12 adjacent peripheral edge 34. In some embodiments, bonding layer 14 and mounting flange 16 are configured such that the width of bonding layer 14 approximately corresponds to the height of mounting flange 16. In other embodiments, mounting flange 16 may have a height greater than or less than the width of bonding layer 14.

In one embodiment, mounting flange 16 may have a generally rectangular cross-section, such that mounting flange 16 includes a top surface 38, a bottom surface 40, and opposite side surfaces 42, 44, with surface 42 being bonded or coupled to bonding layer 14. Top surface 38 provides a mounting surface for coupling mounting flange 16, and in turn basin 12, to a countertop such as countertop 18. According to an exemplary embodiment, top surface 38 is a substantially flat, planar surface and is substantially coplanar with peripheral edge 34. In other embodiments, top surface 38 may be configured to be higher or lower than peripheral edge 34. In one embodiment, after casting mounting flange 16 onto layer 14, top surface 38 and peripheral edge 34 may be processed (e.g., planed, sanded, polished, etc.) to ensure a coplanar top surface for sink assembly 10 and to facilitate mounting of sink assembly 10 to countertop 18.

The cross-sectional size and shape of mounting flange 16 may be varied to suit a particular application and to provide a suitable mounting structure of securing a basin to a countertop. For example, in one embodiment, an adhesive material such as an acrylic glue is used to adhere the top surface of mounting flange 16 to the bottom surface of countertop 18 to provide for an "under-mount" configuration for the sink assembly. Alternatively, mechanical fasteners or other means may be used to secure mounting flange 16 to countertop 18. In some embodiments, mounting flange 16 is generally rectangular and has a width extending out from basin 12 of approximately 1.0 inch and a height extending along sidewalls 30 of basin 12 of approximately 0.5 inches. In other embodiments, the height, width, or shape of mounting flange 16 may vary. The width of mounting flange 16 may in some embodiments be substantially constant around the perimeter of basin 12, while in other embodiments the width of mounting flange 16 may vary around the perimeter of basin 12.

As shown in FIG. 3, basin 12, bonding layer 14, and mounting flange 16 are configured such that when sink assembly 10 is mounted to countertop 18, sink assembly 10 and countertop 18 are coupled in a "seamless fashion" such that there is a generally smooth, planar, and gapless transition between the interior surfaces 23 of sidewalls 30 and surface 22 of countertop 18 that forms opening 20. As such, the interior of sidewalls 30 at peripheral edge 34 have the same dimensions as opening 20 in countertop 18. In other words, sidewalls 30 are configured such that there are no gaps at the interface between peripheral surface 34 and bottom surface 26 of countertop 18.

It should be noted that while sink assembly 10 shown in the FIGURES is a single basin, single drain sink assembly, according to various alternative embodiments, more than one basin and/or drain may be incorporated into the sink assembly (e.g., a double basin, double drain sink, etc.). Sidewalls 30 my include a single sidewall (e.g., in the case of a circular basin) or a plurality of sidwealls (e.g., in the case of a square or rectangular basin). All such modifications are intended to be within the scope of the present disclosure.

Figure 5:
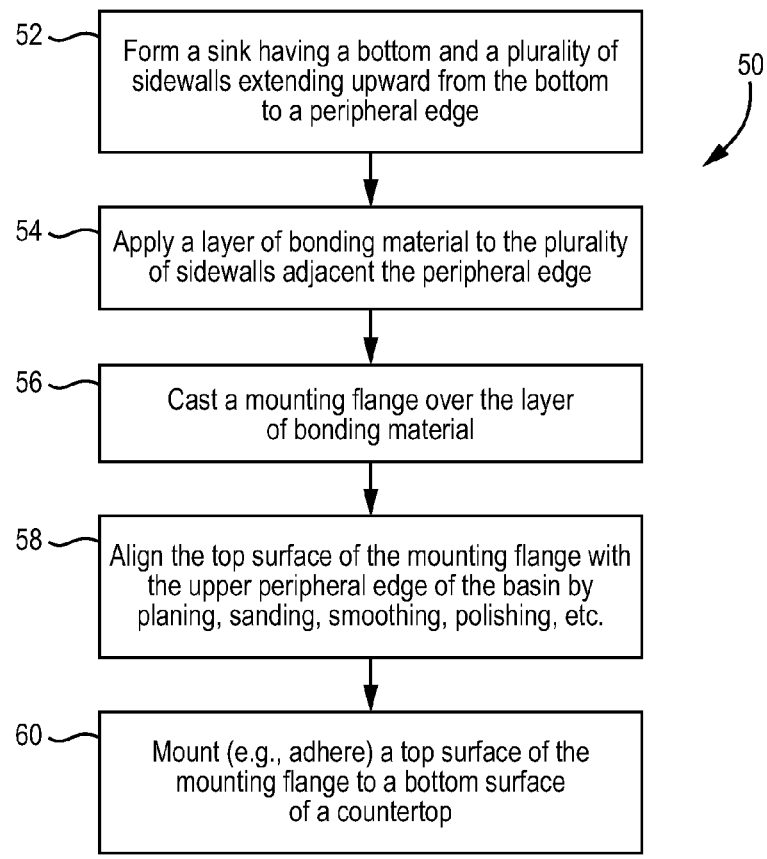
FIG. 5 is a block diagram illustrating a method of producing a sink assembly and under-mounting the sink assembly to a countertop according to an exemplary embodiment.

Referring now to FIG. 5, a method 50 of making and installing a sink assembly is shown according to an exemplary embodiment. First, a basin such as basin 12 is formed (step 52). In one embodiment, a stainless steel sheet of material is drawn over a die to form the basin. In other embodiments, the basin may be any of a variety of metal derivatives (e.g., copper alloys, etc.). After forming the basin, a layer or substrate of bonding material such as layer 14 is applied to the basin (step 54), for example, around the upper peripheral edge of the basin so as to provide a mounting substrate or layer for casting a mounting flange around the upper edge basin. The bonding layer is allowed to set, and a mounting flange such as mounting flange 16 is then cast around the upper perimeter of the basin (step 56). In one embodiment, an appropriate form, or mold, is provided about the perimeter of basin 12 adjacent the upper peripheral edge of the basin, and the polymer casting material is poured into the mold/form. Once the mounting flange sets, the upper peripheral edge of the basin and the top surface of the mounting flange may be sanded, smoothed, polished, etc. (step 58) to provide a generally coplanar surface suitable for mounting the sink assembly to the underside 26 of a countertop. The sink assembly may then be mounted to an underside of a countertop such as countertop 18 (step 60). In one embodiment, an adhesive material such as an acrylic glue is used to adhere the top surface of the mounting flange to the bottom surface 26 of the countertop to provide for an "under-mount" configuration for the sink assembly. Alternatively, mechanical fasteners or other means may be used to fasten the mounting flange to the countertop. Upon the sink assembly being secured to the countertop, an appropriate opening may be made (e.g., cut, routered, etc.) in the countertop such that the opening in the countertop is aligned with the sidewalls of the basin.

Figure 6:
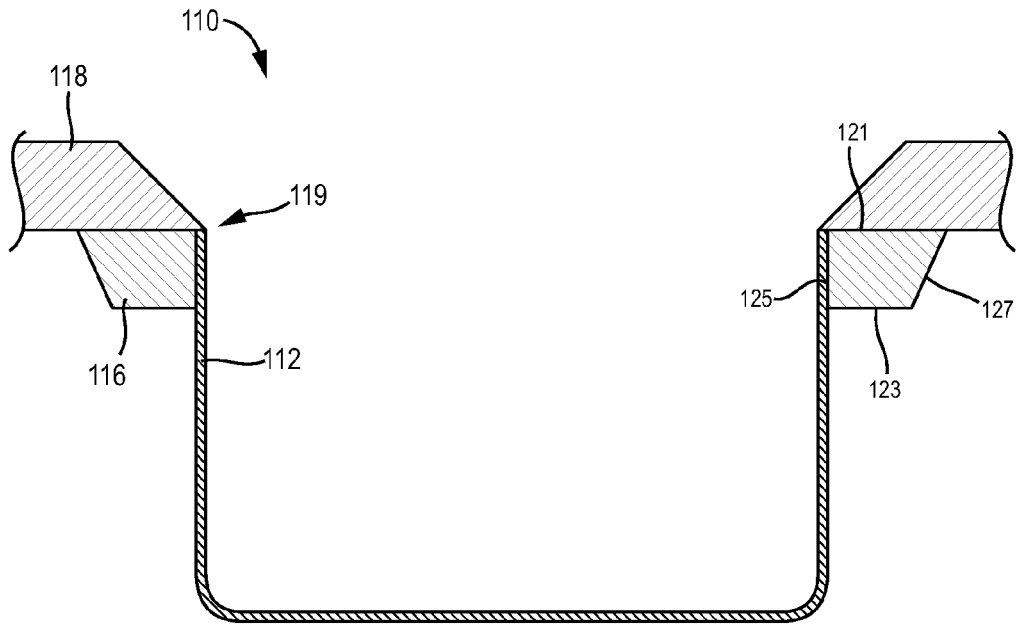
FIG. 6 is a cross-section view of a sink assembly according to another embodiment.

Referring to FIG. 6, a sink assembly 110 is shown mounted to a countertop 118 according to another exemplary embodiment. Sink assembly 110 may share various features with sink assembly 10, including a basin 112 and a mounting flange 116 such that sink assembly 110 may be under-mounted to countertop 118.

In one embodiment, as shown in FIG. 6, sink assembly 110 is configured to be undermounted to countertop 118 such that the inner top portion or edge of basin 112 and the lower inner portion or edge of countertop 118 are nearly co-linear at interface 119, and lie in substantially the same plane (e.g., the plane defined by the linear portion of the upward extending sidewall of basin 112). Interface 119 is substantially gap-free, and as such, may provide an aesthetically please transition between basin 112 and countertop 118. As shown in FIG. 6, countertop 118 may be beveled such that the size of the opening of countertop 118 increases from bottom to top. In other embodiments, the contour of the inside of the opening in countertop 118 may take other forms (e.g., curved, multi-sided, etc.).

Referring further to FIG. 6, in some embodiments, mounting flange 116 may be non-rectangular (e.g., trapezoidal, irregular multi-sided in shape, etc.) in cross-section. For example, as shown in FIG. 6, mounting flange 116 may have top and bottom sides 121, 123, and inner and outer sides 125, 127. Various ones of the sides may form angles of greater or less than ninety degrees to provide various tapers and other features. In one embodiment, mounting flange 116 is a trapezoid having generally parallel top and bottom sides 121, 123, and a beveled side 127 that provides in increase in the width of mounting flange 116 from bottom 123 to top 121. In other embodiments, other cross-sections for mounting flange 116 may be utilized.

According to one embodiment, sink assembly 110 is configured such that, unlike sink assembly 10, no separate bonding layer such as bonding layer 14 is used or required to maintain mounting flange 116 in a secure position relative to basin 112. As such, mounting flange 116 may be directly bonded, or coupled, to basin 112 such that no additional mounting structure (e.g., embedded within mounting flange 116 or otherwise) is required to properly bond mounting flange 116 to basin 112. As such, mounting flange 116 may be entirely supported in position by the direct bonding between mounting flange 116 and basin 112.

It should be understood that the various features shown and described with respect to sink assembly 10 and sink assembly 110 may be used alone or in combination, and the present disclosure is intended to include all such combinations of features. For example, the non-rectangular mounting flange and/or beveled countertop configuration of FIG. 6 may be used in combination with the bonding layer 14 of FIGS. 1-4. Other combinations of features are possible as well.

Providing a sink assembly such as that disclosed herein may provide various benefits over more conventional sink assembly designs. For example, conventional sinks may utilize mounting flanges that are integrally formed with the sidewalls of the stainless steel basin. Because of manufacturing limitations, there is generally a curved transition between the sidewall portion of the basin and the flange portion of the basin. As such, there is a recess, or seam created between the curved transition of the basin and the underside of the countertop upon installation of the sink. Utilizing a cast mounting flange such as that disclosed herein avoids the recess, or seam, and provides a more "seamless" appearance to the sink assembly integrated into the countertop, which may be more visually appealing to users and be less susceptible to capturing debris, leakage, etc.

Furthermore, while other conventional under-mount designs may utilize some type of separate mounting flange, these typically require a separate support bracket to first be mounted (e.g., welded or otherwise fastened) around the perimeter of the stainless steel basin to ensure proper retention of mounting flange onto the basin. Utilizing an adhesive bonding layer such as that disclosed herein avoids the necessity of this additional structure, and potentially reduces production cycle times and costs.

It should be understood that the construction and arrangement of the elements of the sink assembly shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the components and/or assemblies of the sink assembly may be constructed from any of a wide variety of materials that provide sufficient strength or durability, in any of a wide variety of colors, textures, and combinations.

What is claimed is:

1. A sink assembly comprising:
   a basin comprising one or more sidewalls having interior and exterior surfaces, the one or more sidewalls defining an interior and a top opening;
   a layer of bonding material provided on the exterior surfaces of the one or more sidewalls and extending about the top opening; and
   a mounting flange coupled to the layer of bonding material and extending about the top opening of the basin;
   wherein the mounting flange is cast onto the layer of bonding material.

2. The sink assembly of claim 1, wherein the one or more sidewalls define an upward extending surface terminating at an uppermost peripheral edge, the uppermost edge being substantially coplanar with a top surface of the mounting flange.

3. The sink assembly of claim 2, wherein the basin is configured to be coupled to an underside of a countertop having an opening such that the interior surface of at least one of the one or more sidewalls is substantially coplanar with a surface defining the opening in the countertop.

4. The sink assembly of claim 3, wherein the one or more sidewalls and the interior surface of the countertop defining the opening in the countertop form a substantially smooth and gap-free seam.

5. The sink assembly of claim 1, wherein the layer of bonding material comprises a gel coat applied to the basin.

6. The sink assembly of claim 5, wherein the layer of bonding material has a width equal to or greater than a thickness of the mounting flange.

7. The sink assembly of claim 1, wherein the mounting flange comprises a polymer material.

8. The sink assembly of claim 1, wherein the mounting flange has a substantially rectangular cross-section.

9. The sink assembly of claim 8, wherein the mounting flange has a substantially constant width.

10. The sink assembly of claim 1, wherein the mounting flange comprises a top surface configured to be adhered to an underside of a countertop.

11. The sink assembly of claim 1, wherein the basin comprises a metal material.

12. A method of producing a sink assembly, the method comprising:
    forming a sink basin having a bottom and one or more sidewalls extending upward from the bottom to a peripheral edge;
    applying a layer of bonding material to the one or more sidewalls adjacent the peripheral edge; and
    casting a mounting flange over the layer of bonding material to bond the mounting flange to the layer of bonding material.

13. The method of claim 12, wherein the sink basin is a stainless steel basin and the mounting flange is a cast polymer material.

14. The method of claim 12, wherein layer of bonding material comprises a vinylester gel coat.

15. The method of claim 12, wherein applying the layer of bonding material comprises utilizing at least one of a spray applicator, a roller applicator, and a brush applicator.

16. The method of claim 12, further comprising aligning the top surface of the mounting flange with the upper peripheral edge of the basin by planing, sanding, smoothing, polishing, or a combination thereof 17. The method of claim 12, further comprising adhering a top surface of the mounting flange to a bottom surface of a countertop to secure the basin to the countertop.

18. The method of claim 17, further comprising cutting an opening in the countertop to define a substantially smooth transition between the plurality of sidewalls of the basin and a surface defining the opening on the countertop.

19. An under-mount sink assembly configured to be mounted to an underside of a countertop, the sink assembly comprising:

a metal basin, the basin comprising a bottom and a plurality of sidewalls extending upward from the bottom to a top peripheral edge; and a cast polymer mounting flange bonded directly to the basin and having an upper surface configured to be coupled to the underside of a countertop;

wherein the mounting flange is retained in position relative to the metal basin entirely by the direct bonding between the basin and the mounting flange.

20. The sink assembly of claim 19, wherein the mounting flange is retained in position without embedded structural support.

21. The sink assembly of claim 19, wherein the upper surface of the mounting flange is substantially coplanar with the top peripheral edge of the basin.

22. The sink assembly of claim 21, wherein the mounting flange is bonded directly to an upper and substantially smooth exterior portion of the plurality of sidewalls.

* * * * *